(12) United States Patent
Subbaian et al.

(10) Patent No.: US 9,167,129 B1
(45) Date of Patent: Oct. 20, 2015

(54) METHOD AND APPARATUS FOR SEGMENTING IMAGE INTO HALFTONE AND NON-HALFTONE REGIONS

(71) Applicant: Xerox Corporation, Norwalk, CT (US)

(72) Inventors: Sudhagar Subbaian, Thondamuther (IN); Sainarayanan Gopalakrishnan, Medavakkam (IN); Vignesh Doss, Palani Chettipatti (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/568,820

(22) Filed: Dec. 12, 2014

(51) Int. Cl.
*H04N 1/04* (2006.01)
*H04N 1/405* (2006.01)

(52) U.S. Cl.
CPC .................................. *H04N 1/40018* (2013.01)

(58) Field of Classification Search
CPC ................................................. H04N 1/40018
USPC ................... 358/2.1, 1.9, 3.28, 3.06
See application file for complete search history.

(56) References Cited

U.S. PATENT DOCUMENTS

| 5,850,474 | A | * | 12/1998 | Fan et al. ....................... 382/173 |
| 8,014,035 | B2 | * | 9/2011 | Monga et al. ................ 358/3.28 |
| 2004/0076328 | A1 | | 4/2004 | Li |
| 2004/0114185 | A1 | | 6/2004 | Shiau et al. |
| 2005/0271277 | A1 | | 12/2005 | Lin et al. |
| 2007/0242288 | A1 | | 10/2007 | Fan |
| 2010/0060943 | A1 | | 3/2010 | Monga et al. |
| 2010/0290089 | A1 | | 11/2010 | Stevens |
| 2014/0294298 | A1 | | 10/2014 | Palanivel et al. |

* cited by examiner

*Primary Examiner* — Houshang Safaipour
(74) *Attorney, Agent, or Firm* — Fay Sharpe LLP

(57) ABSTRACT

A method of segmenting an image into halftone and non-halftone regions includes: processing a pixel block of a grayscale image using a thresholding algorithm and an intensity threshold to form a binary block, the pixel block including grayscale pixels with intensity values, the binary block including binary pixels with binary values; identifying a pixel group in the binary block, wherein the pixel group includes connected pixels represented by a select binary value, wherein pixels in the pixel group adjacent to pixels of the pixel block represented by another binary value are identified as boundary pixels of the pixel group; and processing the pixel group using a scale invariant feature transform (SIFT) algorithm to extract keypoints from the pixel group to form a keypoint map in conjunction with segmenting the grayscale image into halftone and non-halftone regions. An image processing device for performing the method is also provided.

26 Claims, 12 Drawing Sheets

$I$   $I_1$   $I_{K1}$   $I_{K2}$ $I$   $I_1$   $I_{K1}$   $I_{K2}$

RECEPTION AREA ACTIVE

The reception area is a large 2 story space that serves as the nerve center of the complex, directing the personnel circulatory system. Long corridors are eliminated. Since all personnel circulate around the core, it stimulates an environment of activity.

/

RECEPTION AREA ACTIVE

The reception area is a large 2 story space that serves as the nerve center of the complex, directing the personnel circulatory system. Long corridors are eliminated. Since all personnel circulate around the core, it stimulates an environment of activity /s

FIG. 4

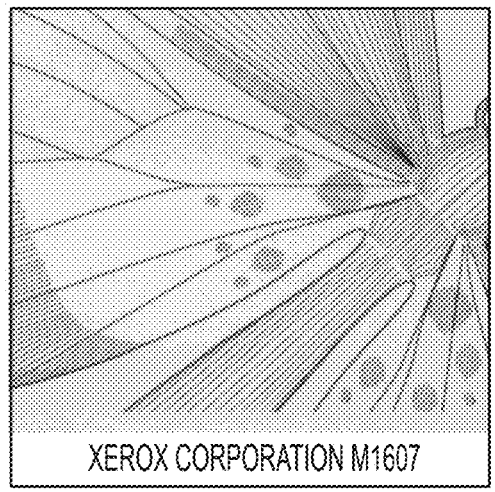
$I$
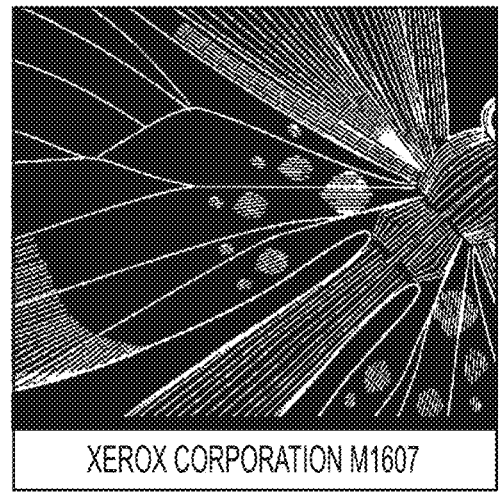
$I_S$
FIG. 5

METHOD AND APPARATUS FOR SEGMENTING IMAGE INTO HALFTONE AND NON-HALFTONE REGIONS

BACKGROUND

This disclosure presents various embodiments of a method of segmenting an image into halftone and non-halftone regions. In several embodiments, the method is applied to define a process for identifying a block of pixels in a grayscale image to define a binary image, identifying a group of connected pixels in the binary image to define a region of interest, and to process the region of interest for classification as a halftone or non-halftone region based at least in part on using a scale invariant feature transform (SIFT) algorithm. However, the method can also be applied to multiple groups of connected pixels from the same block and to multiple blocks of pixels from the grayscale image. Parallel processing can be used to process multiple groups of connected pixels. Similarly, parallel processing can be used to process multiple blocks of pixels. Various embodiments of an image processing device for performing the method are also provided. The disclosure also presents various embodiments of a computer-readable medium storing program instructions that, when executed, cause an image processing device to perform the method.

For copy and scan jobs, different regions in the original image, such as contone, halftone, text and lines are usually processed differently for rescreening or for compression respectively. Separation of text regions from the rest of the objects is the main challenge in segmentation of the original image.

Separation of halftone and non-halftone regions in a document image is vital for numerous purposes, such as: i) to avoid image quality artifacts when rescreening the image while copying, ii) for better text recognition using OCR on scanned documents, iii) to improve any type of information extraction, such as data in forms, etc., and iv) for better image compression performance.

The existing approaches to separation of halftone and non-halftone regions have various limitations, such as: i) auto-windowing based methods are computationally complex for real time/software implementation in MFDs, as pixel based micro-segmentation tags are generated using algorithms implemented in ASICs; ii) in connected component based approaches, selecting proper threshold to form the connected component is difficult and, if the proper threshold is not selected, the possibility of misclassification is higher, iii) since the raw image handled by MFD's is of high resolution, time and computation costs are higher, and iv) when there is scale or rotational variation in the image, usage of certain methods (e.g., run-length) fails in determining halftone regions.

BRIEF DESCRIPTION

In one aspect, a method of segmenting an image into halftone and non-halftone regions is provided. In one embodiment, the method includes: processing a first pixel block of a grayscale image at an image processing device using a thresholding algorithm and a first intensity threshold to form a first binary block, the first pixel block including a plurality of grayscale pixels, each grayscale pixel having an intensity value, the first binary block including a plurality of binary pixels, each binary pixel having a binary value; identifying a first pixel group in the first binary block, wherein the first pixel group includes connected pixels represented by a first binary value, wherein pixels in the first pixel group adjacent to pixels of the first pixel block that are represented by a second binary value are identified as boundary pixels of the first pixel group; and processing the first pixel group at the image processing device using a scale invariant feature transform (SIFT) algorithm to extract keypoints from the first pixel group to form a first keypoint map in conjunction with segmenting the grayscale image into halftone and non-halftone regions.

In another aspect, an image processing device for segmenting an image into halftone and non-halftone regions is provided. In one embodiment, the image processing device includes: at least one image processor configured to execute program instructions; and a non-transitory storage device configured to store program instructions that, when executed by the at least one processor, cause the image processing device to perform a method of segmenting an image into halftone and non-halftone regions. In conjunction with execution of the program instructions, the at least one image processor is configured to process a first pixel block of a grayscale image using a thresholding algorithm and a first intensity threshold to form a first binary block, the first pixel block including a plurality of grayscale pixels, each grayscale pixel having an intensity value, the first binary block including a plurality of binary pixels, each binary pixel having a binary value. In conjunction with execution of the program instructions, the at least one image processor is configured to identify a first pixel group in the first binary block, wherein the first pixel group includes connected pixels represented by a first binary value, wherein pixels in the first pixel group adjacent to pixels of the first pixel block that are represented by a second binary value are identified as boundary pixels of the first pixel group. In conjunction with execution of the program instructions, the at least one image processor is configured to process the first pixel group using a scale invariant feature transform (SIFT) algorithm to extract keypoints from the first pixel group to form a first keypoint map in conjunction with segmenting the grayscale image into halftone and non-halftone regions.

In another aspect, a non-transitory computer-readable medium storing program instructions is provided. When executed by at least one processor, the program instructions cause a corresponding image processing device to perform a method of segmenting an image into halftone and non-halftone regions. In one embodiment, the method includes: processing a first pixel block of a grayscale image at an image processing device using a thresholding algorithm and a first intensity threshold to form a first binary block, the first pixel block including a plurality of grayscale pixels, each grayscale pixel having an intensity value, the first binary block including a plurality of binary pixels, each binary pixel having a binary value; identifying a first pixel group in the first binary block, wherein the first pixel group includes connected pixels represented by a first binary value, wherein pixels in the first pixel group adjacent to pixels of the first pixel block that are represented by a second binary value are identified as boundary pixels of the first pixel group; processing the first pixel group at the image processing device using a scale invariant feature transform (SIFT) algorithm to extract keypoints from the first pixel group to form a first keypoint map in conjunction with segmenting the grayscale image into halftone and non-halftone regions; discarding keypoints from the first keypoint map that correspond to boundary pixels of the first pixel group to form a second keypoint map for the first pixel group; processing quantities of keypoints in the first and second keypoint maps at the image processing device using a classification algorithm to classify the first pixel group in the grayscale image as a halftone or non-halftone region in conjunction with segmenting the grayscale image into halftone and non-halftone regions; processing the first pixel block at the image processing device using the thresholding algorithm and a second intensity threshold to form a second binary block, the second intensity threshold representing a predetermined fixed intensity that is intended to be higher than the intensity of text objects, the second binary block including a plurality of binary pixels; identifying binary pixels in the second binary block corresponding to the first pixel group; processing binary values for pixels in the first pixel group of the second binary block and binary values for pixels in the second keypoint map at the image processing device using the classification algorithm to classify the first pixel group in the grayscale image as a halftone or non-halftone region in conjunction with segmenting the grayscale image into halftone and non-halftone regions; segmenting the grayscale image into halftone and non-halftone regions to form a segmented image based at least in part on the classification of the first pixel group; and sending the segmented image from the image processing device to a segment processing device via an output interface.

BRIEF DESCRIPTION OF THE DRAWINGS

FIG. 4 provides exemplary grayscale (I) and segmented output ($I_S$) images for a non-halftone label region with text;

FIG. 5 provides exemplary grayscale (I) and segmented output ($I_S$) images for a non-halftone label region with thin lines;

DETAILED DESCRIPTION

Figure 1:
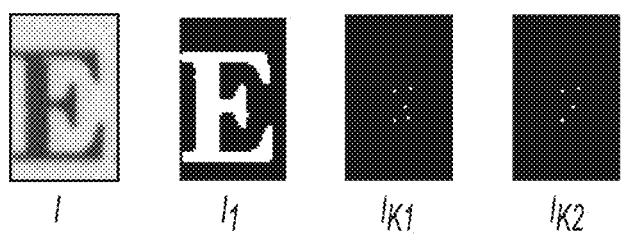
FIG. 1 provides exemplary grayscale (I), binary ($I_1$), SIFT keypoint label ($I_{K1}$), and SIFT keypoint label without border pixels ($I_{K2}$) images for a non-halftone label region.

The disclosure describes various embodiments of method and apparatus for segmenting halftone and non-halftone region using relative feature points derived from a grayscale image by using a scale invariant feature transform (SIFT) algorithm. A scanned image converted into a binary image using a thresholding algorithm and a connected component analysis. Relative SIFT keypoints are used to classify the image into halftone and non-halftone regions. The process is label based which enables the parallel processing of the SIFT features for separate areas derived from the connected component analysis.

Generally, SIFT keypoints are invariant to image translation, scaling, and rotation and the SIFT algorithm is useful for matching and recognition of images. The various embodiments described herein show how David Lowe's SIFT keypoint detector helps in segmenting the halftone and non-halftone regions in an image. Initially, an input image is thresholded to form a binary image. Connected regions in the binary image are labeled. SIFT keypoint features of each label are analyzed to classify the connected area as a halftone or non-halftone region.

First, an acquired/scanned image is converted into grayscale image and preprocessed by adjusting a dynamic range of the intensity of pixels in the original image to obtain the grayscale image 'I'. For example, the parameters for adjustment of the intensity may be drawn from a background suppression module.

The grayscale image 'I' is split into distinct blocks of m×n pixels kernel size, represented as 'B'. For Binary image $I_1$, for each block m×n:

$$I_1 = \begin{cases} 1 & \text{if } I(i,j) < t(B)_1 \\ 0 & \text{otherwise} \end{cases};$$

where $t(B)_1$ is the threshold of block B.

$$t(B)_1 = \begin{cases} (\max_B + \min_B) * w_1 & \text{if } B_U > (\max_B - \min_B) > B_L \\ (WhitePoint) * w_2 & \text{otherwise} \end{cases};$$

where $\max_B$ & $\min_B$ are the maximum and minimum intensity values in the block 'B' in $I_1$ and WhitePoint is the white point value obtained from background suppression module. $B_U$ & $B_L$ are the constants representing upper and lower block thresholds limits and $w_1$ & $w_2$ are gain values.

If the difference between the max intensity and min intensity in the block falls within the $B_U$ & $B_L$ range—the threshold is selected as $(\max_B + \min_B)*w_1$; which enables to select a mid threshold value. For example, $w_1$ is selected as 0.4 and $B_U$ & $B_L$ are selected as '200' and '0' in one embodiment.

If the difference between the max intensity and min intensity in the block does not fall within the $B_U$ & $B_L$ range, there is large intensity change. In this case WhitePoint is scaled with $w_2$ as threshold. For example, $w_2$ is selected as 1.05. Since the segmentation is applied on the background suppressed image, $w_2$ is selected higher than 1.

For the second binary image '$I_2$', grayscale image 'I' is binarized using a different threshold '$t_1$'. For example, $t_1$ is selected as 80.

Labels are assigned to each group of connected binary pixels for the image '$I_1$'. For example, the total number of labels in '$I_1$' is 'N' and $I_1(X)$ refers to an $X^{th}$ label in image $I_1$.

For each label in binary image '$I_1$', the SIFT algorithm is used on the grayscale image 'I' to extract its keypoints. For example, '$I_{K1}$' is the feature map representing the locations of keypoints for a label X; 'K1' is the total number of keypoints in '$I_{K1}$'; 'B(x)' is the binary map of boundary pixels for a label '$I_1(X)$'; '$I_{K2}$' is the new feature map obtained by discarding keypoints in boundary of the '$I_1(X)$'; and 'K2' be the total keypoints in '$I_{K2}$'.

SIFT keypoints are usually found more at edge regions and boundaries.

The relative number of SIFT keypoints between the halftone region and non-halftone region differs. Based on this amount, certain distributions of relative SIFT features based on three conditions can are used to segment halftone and non-halftones regions in an image.

Condition 1: $(K1+K2)<t_2$. In Condition 1, the total counts of before and after eliminating feature points from edge against a threshold is used to verify a particular region as a non-halftone region. Note that for thin line and solid text the total counts are always very low.

Condition 2: $(K1/K2<t_3)$ & $(K2<t_4)$. In Condition 2, a ratio-based estimation of a label is provided. The threshold $t_4$ is selected to be high to distinguish between graphics (bigger in size) and joint text (small/big).

Condition 3: $sum(I_2(X)$ & $I_{K2})<t_5$. In Condition 3, the common regions between the $I_2(X)$ and $I_{K2}$ is estimated. This helps to avoid misclassification of thin line/text and halftone.

An exemplary embodiment of pseudo code representing the three conditions for classifying non-halftone regions in the grayscale image is provided below: if length(find (I!=255))>(sum(B(X))*0.95)
{
  If (K1+K2<$t_2$)||(K1/K2<$t_3$) & (K2<$t_4$))
  {
    $I_s$(X)=1 //Non-Halftone region
  }
  else
  {
    $I_s$(X)=0 //Halftone region
  }
}
else
{
  If (sum($I_2$(X) & $I_{K2}$)<$t_5$)
  {
    $I_s$(X)=1 //Non-Halftone region
  else
  {
    $I_S$(X)=0 //Halftone region
  }
}
where $I_S$(X) is segmented image for label 'X'; $t_2$, $t_3$, $t_4$ and $t_5$ are the thresholds selected through experimentations. For example, $t_2$ can be set to 50, $t_3$ can be set to 2, $t_4$ can be set to 1000, and $t_5$ can be set to 50.

The above process can be carried out until the $N^{th}$ label in image '$I_1$' is processed. Then, the resulting image $I_s$ with each label classified will became a tag plane for the input grayscale image 'I'. For example, the image $I_s$ will have '0' for halftone regions and '1' for non-halftone regions (i.e., graphics, text, and lines). The SIFT keypoints calculation on the every labeled components of image and decision making of halftone and non-halftone can be done using parallel processing which can reduce the time and computation cost.

Figure 2:
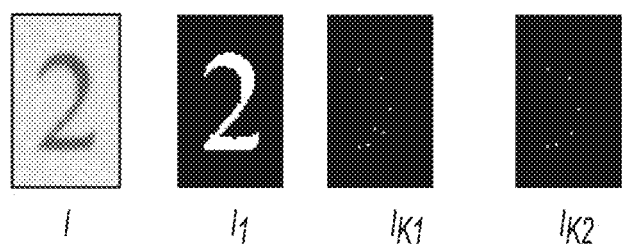
FIG. 2 provides additional exemplary grayscale (I), binary ($I_1$), SIFT keypoint label ($I_{K1}$), and SIFT keypoint label without border pixels ($I_{K2}$) images for a non-halftone label region.
Figure 3:
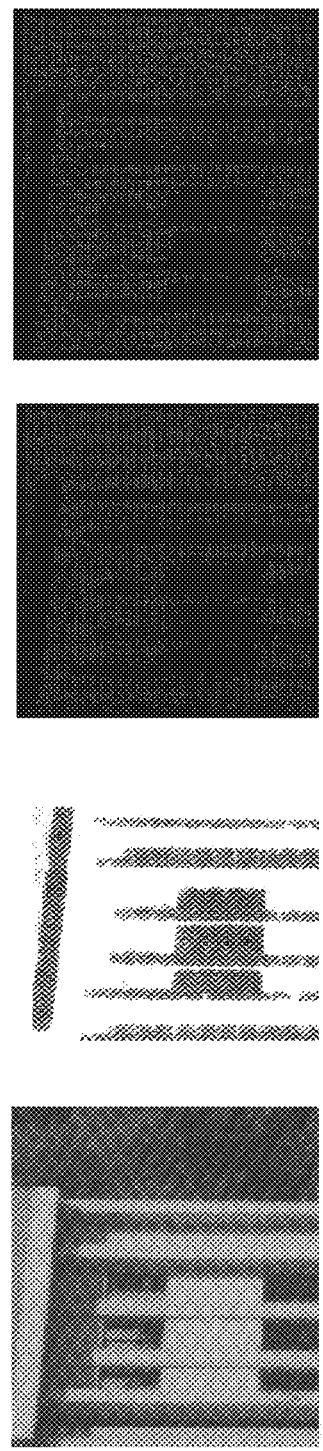
FIG. 3 provides exemplary grayscale (I), binary ($I_1$), SIFT keypoint label ($I_{K1}$), and SIFT keypoint label without border pixels ($I_{K2}$) images for a halftone label region.

The results are arranged as grayscale image I; thresholded image $I_1$; feature map $I_{K1}$ and feature map $I_{K2}$ obtained from SIFT. FIGS. 1 and 2 show non-halftone regions and FIG. 3 shows a halftone region.

Figure 6:
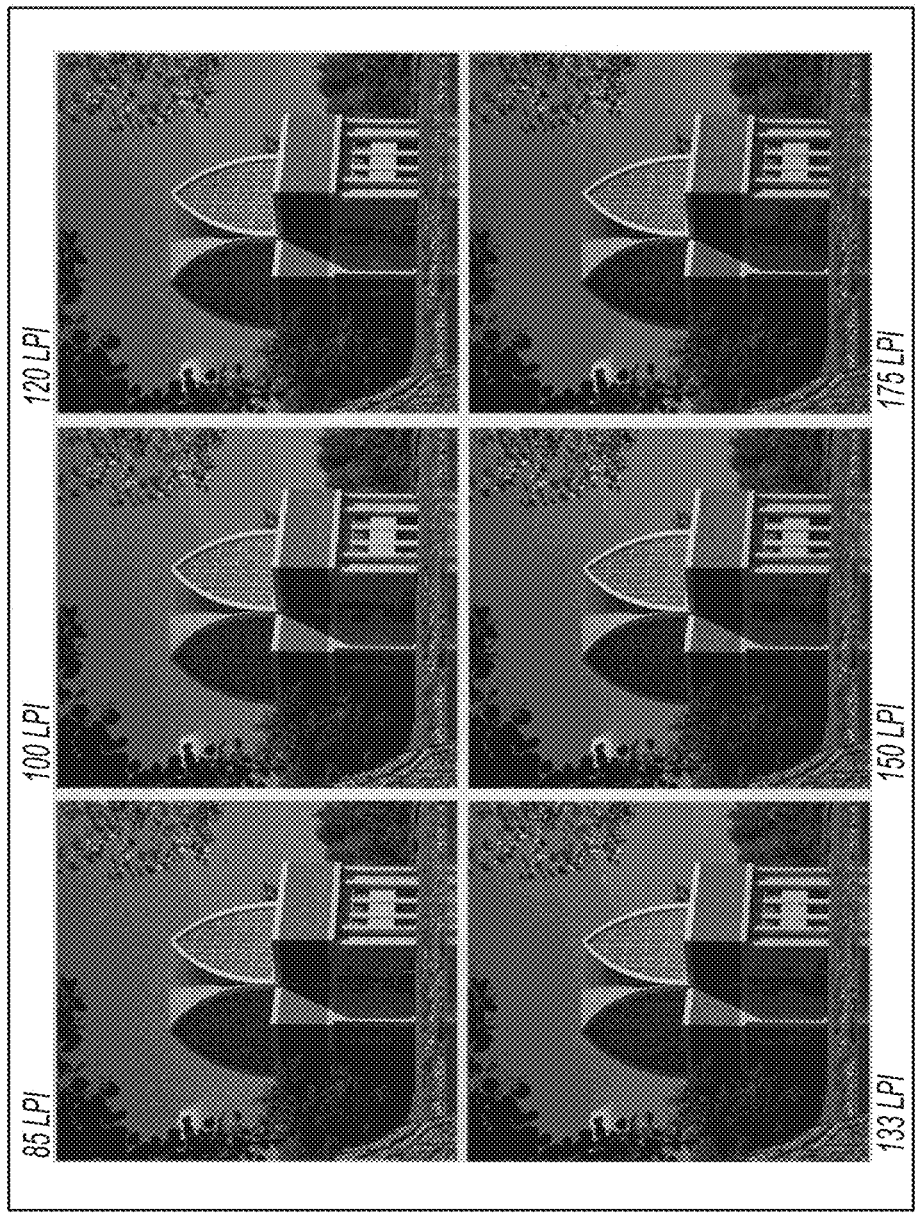
FIGS. 6 and 7 provide exemplary grayscale (I) and segmented output ($I_S$) images for a halftone label region with photographs.
Figure 7:
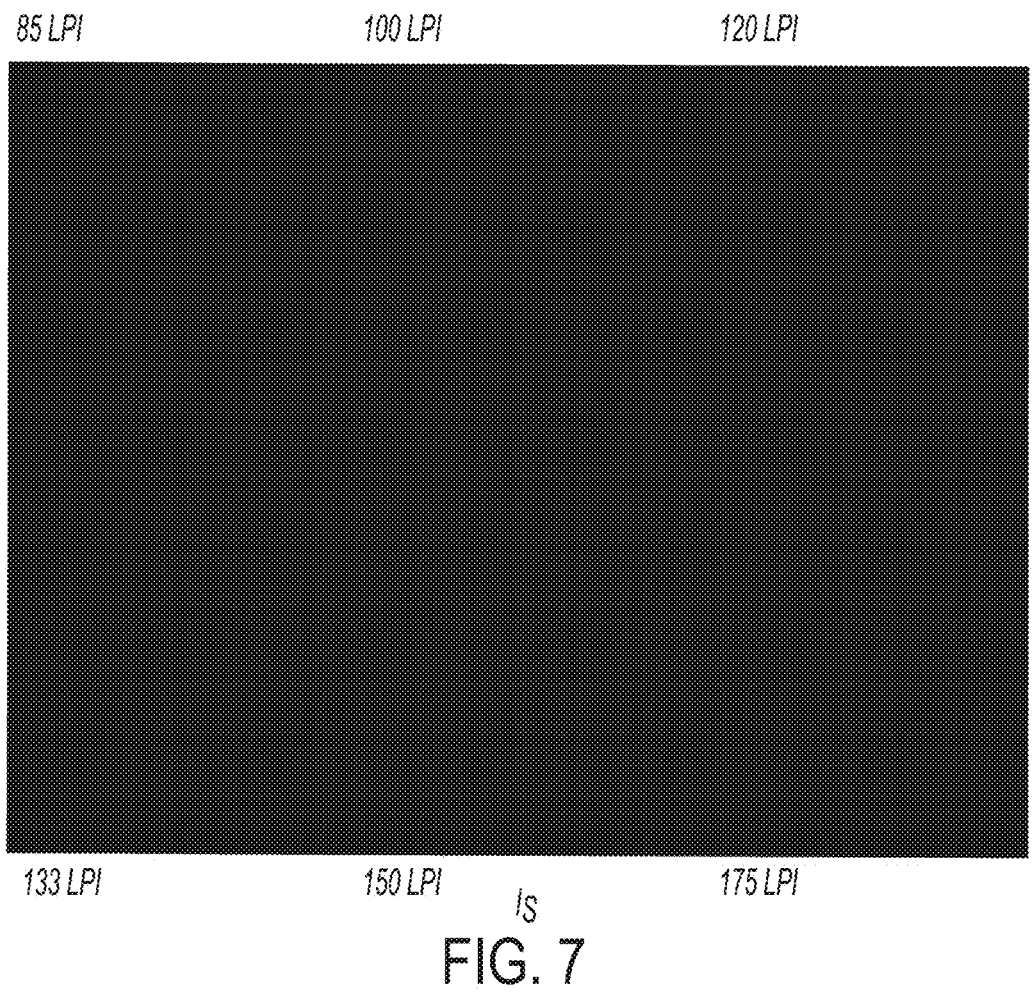

The results of the process are arranged as input image and the final segmented output $I_s$ representing the non-halftone region. FIG. 4 represent a test sample with text; FIG. 5 represent a test sample with thin lines; and FIGS. 6 and 7 represent a test sample with pictures having wide range of halftone frequency 85 lpi to 175 lpi.

Figure 8:
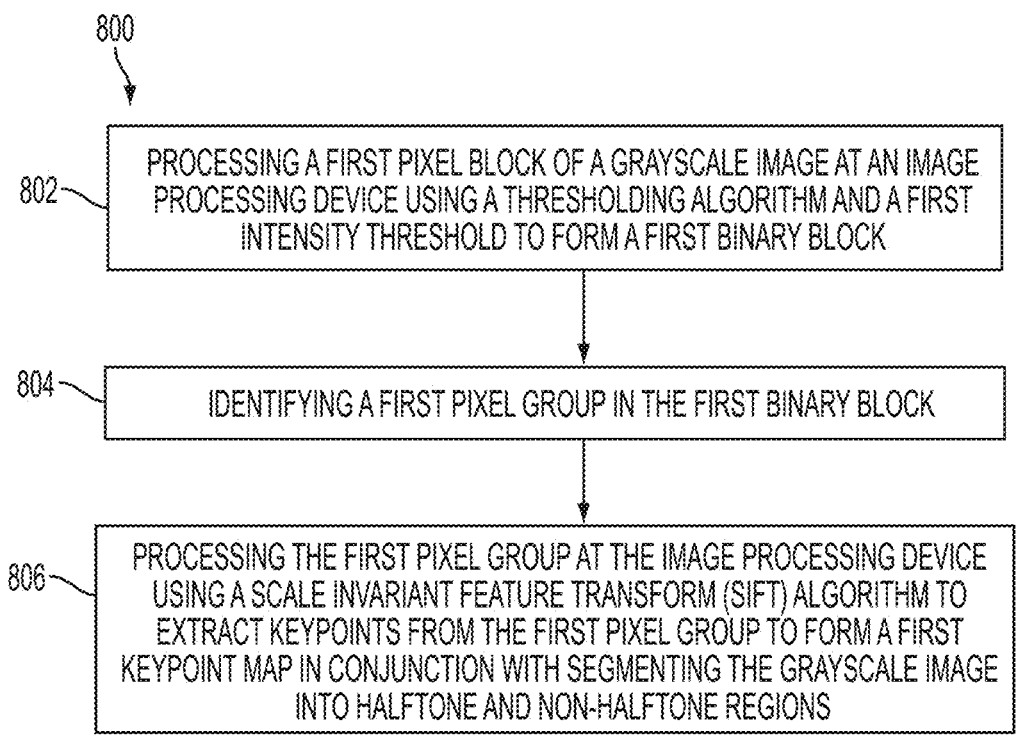
FIG. 8 is a flowchart of an exemplary embodiment of a process for segmenting an image into halftone and non-halftone regions.

With reference to FIG. 8, an exemplary embodiment of a process 800 for segmenting an image into halftone and non-halftone regions begins at 802 where a first pixel block of a grayscale image is processed at an image processing device using a thresholding algorithm and a first intensity threshold to form a first binary block. The first pixel block including a plurality of grayscale pixels. Each grayscale pixel having an intensity value. The first binary block including a plurality of binary pixels. Each binary pixel having a binary value. Next, a first pixel group is identified in the first binary block (804). The first pixel group includes connected pixels represented by a first binary value. Pixels in the first pixel group adjacent to pixels of the first pixel block that are represented by a second binary value are identified as boundary pixels of the first pixel group. At 806, the first pixel group is processed at the image processing device using a scale invariant feature transform (SIFT) algorithm to extract keypoints from the first pixel group to form a first keypoint map in conjunction with segmenting the grayscale image into halftone and non-halftone regions.

In yet another embodiment of the process 800, the first pixel block is a predetermined kernel size defined by a predetermined amount of rows and columns. In still another embodiment of the process 800, for each grayscale pixel in the first pixel block, the thresholding algorithm sets the corresponding binary pixel in the first binary block to a reference black value after determining the corresponding grayscale pixel is lower in intensity than the first intensity threshold and, otherwise, sets the corresponding binary pixel to a reference white value.

In still yet another embodiment, the process 800 also includes calculating the first intensity threshold at the image processing device based at least in part on maximum and minimum intensity values for the plurality of grayscale pixels in the first pixel block and a lower range weighting factor after determining a difference between the maximum and minimum intensity values for the plurality of grayscale pixels is between an upper intensity threshold and a lower intensity threshold and, otherwise, sets the first intensity threshold based on a reference white value and a higher range weighting factor, the higher range weighting factor being greater than the lower range weighting factor.

Figure 9:
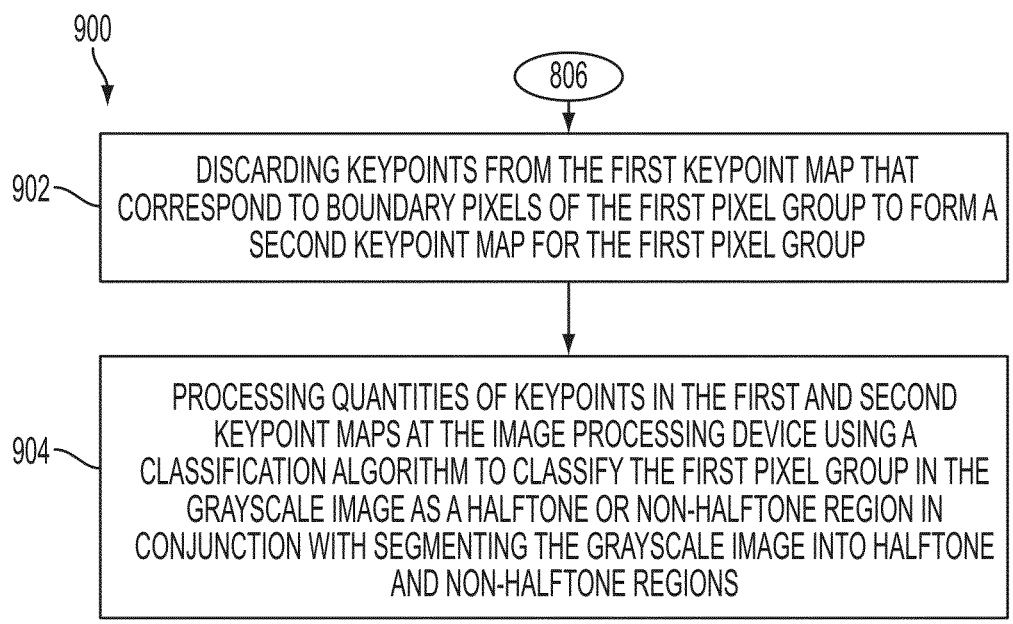
FIG. 9, in combination with FIG. 8, is a flowchart of another exemplary embodiment of a process for segmenting an image into halftone and non-halftone regions.

With reference to FIGS. 8 and 9, an exemplary embodiment of a process 900 for segmenting an image into halftone and non-halftone regions includes the process 800 of FIG. 8. The process 900 continues from 806 to 902 where keypoints from the first keypoint map that correspond to boundary pixels of the first pixel group are discarded to form a second keypoint map for the first pixel group. At 904, quantities of keypoints in the first and second keypoint maps are processed at the image processing device using a classification algorithm to classify the first pixel group in the grayscale image as a halftone or non-halftone region in conjunction with segmenting the grayscale image into halftone and non-halftone regions.

In another embodiment, the process 900 also includes segmenting the grayscale image into halftone and non-halftone regions to form a segmented image based at least in part on the classification of the first pixel group. The segmented image is sent from the image processing device to a segment processing device via an output interface.

In yet another embodiment of the process 900, the classification algorithm classifies the first pixel group in the grayscale image as a non-halftone region based at least in part on determining a sum of quantities of keypoints in the first and second keypoint maps is less than a first classification threshold. In still another embodiment of the process 900, the classification algorithm classifies the first pixel group in the grayscale image as a non-halftone region based at least in part on determining a ratio of quantities of keypoints in the first keypoint map to quantities of keypoints in the second keypoint map is less than a second classification threshold. In still yet another embodiment of the process 900, the classification algorithm classifies the first pixel group in the grayscale image as a non-halftone region based at least in part on determining the quantity of keypoints in the second keypoint map is less than a third classification threshold.

In still another embodiment of the process 900, the classification algorithm classifies the first pixel group in the grayscale image as a non-halftone region based at least in part on: i) determining a sum of quantities of keypoints in the first and second keypoint maps is less than a first classification threshold; or ii) a) determining a ratio of quantities of keypoints in the first keypoint map to quantities of keypoints in the second keypoint map is less than a second classification threshold; and b) determining the quantity of keypoints in the second keypoint map is less than a third classification threshold.

In still yet another embodiment, the process 900 also includes identifying a plurality of pixel groups in the first binary block. The plurality of pixel groups including the first pixel group. Each pixel group includes either connected pixels represented by a first binary value or connected pixels represented by a second binary value. Pixels in each pixel group that are adjacent to other pixel groups are identified as boundary pixels of the corresponding pixel group. Each of the plurality of pixel groups is processed in the same manner as the first pixel group in conjunction with segmenting the grayscale image into halftone and non-halftone regions.

In a further embodiment, the process 900 also includes segmenting the grayscale image into halftone and non-halftone regions to form a segmented image based at least in part on the classification of the plurality of pixel groups. The segmented image is sent from the image processing device to a segment processing device via an output interface.

In another further embodiment, the process 900 also includes dividing the grayscale image into a plurality of pixel blocks. The plurality of pixel blocks including the first pixel block. Each pixel block including a plurality of grayscale pixels. Each of the plurality of pixel blocks is processed in the same manner as the first pixel block in conjunction with segmenting the grayscale image into halftone and non-halftone regions. In an even further embodiment, the process 900 also includes generating a tag plane for the grayscale image in which pixel groups classified as halftone regions are tagged as halftone regions and pixels groups classified as non-halftone regions are tagged as non-halftone regions to segment the grayscale image into halftone and non-halftone regions.

Figure 10:
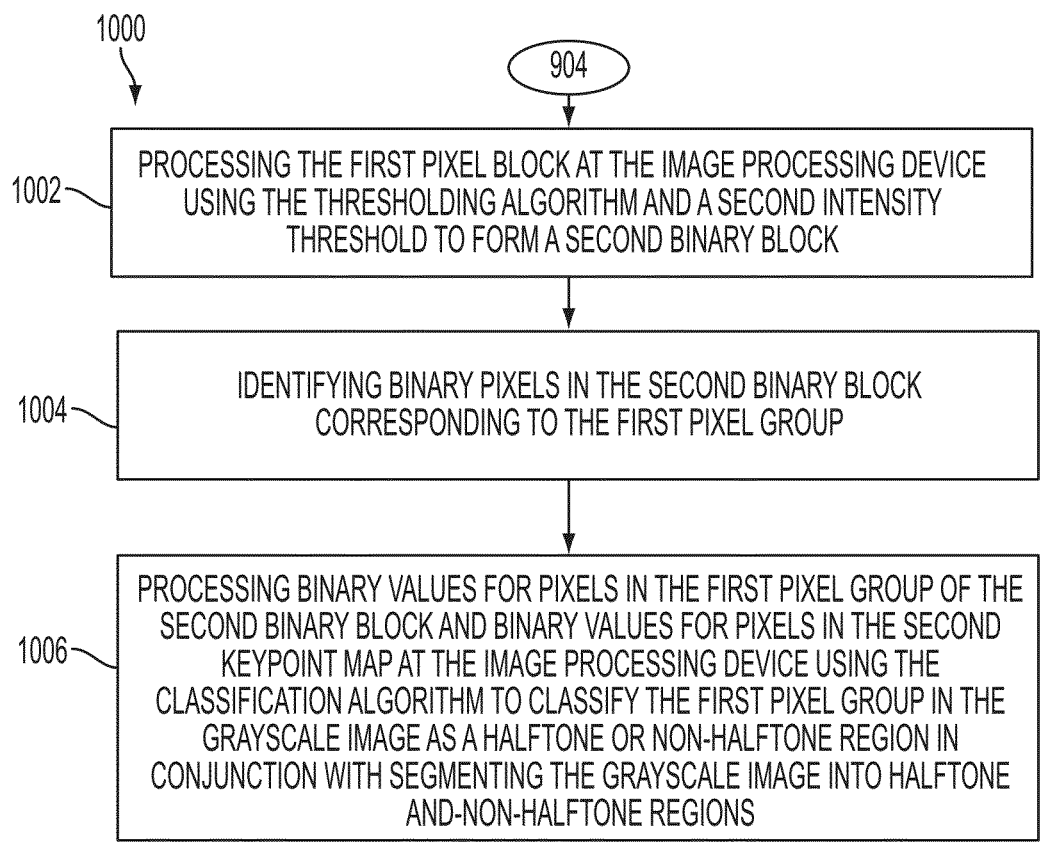
FIG. 10, in combination with FIGS. 8 and 9, is a flowchart of yet another exemplary embodiment of a process for segmenting an image into halftone and non-halftone regions.
Figure 11:
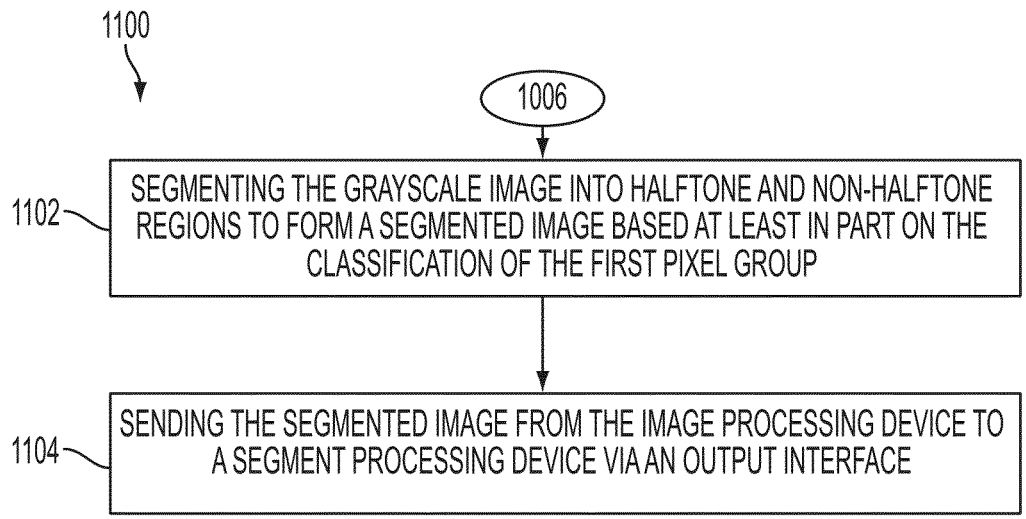
FIG. 11, in combination with FIGS. 8-10, is a flowchart of still another exemplary embodiment of a process for segmenting an image into halftone and non-halftone regions.

With reference to FIGS. 8-10, an exemplary embodiment of a process 1000 for segmenting an image into halftone and non-halftone regions includes the processes 800, 900 of FIGS. 8 and 9. The process 1000 continues from 904 to 1002 where the first pixel block is processed at the image processing device using the thresholding algorithm and a second intensity threshold to form a second binary block. The second intensity threshold representing a predetermined fixed intensity that is intended to be higher than the intensity of text objects. For example, a fixed intensity of 80 may be used for the second intensity threshold where the range of intensity is from 0 to 255. The second binary block including a plurality of binary pixels. At 1004, binary pixels in the second binary block corresponding to the first pixel group are identified. Next, binary values for pixels in the first pixel group of the second binary block and binary values for pixels in the second keypoint map are processed at the image processing device using the classification algorithm to classify the first pixel group in the grayscale image as a halftone or non-halftone region in conjunction with segmenting the grayscale image into halftone and non-halftone regions (1006).

In another embodiment of the process 1000, for each grayscale pixel in the first pixel block, the thresholding algorithm sets the corresponding binary pixel in the second binary block to a reference black value after determining the corresponding grayscale pixel is lower in intensity than the second intensity threshold and, otherwise, sets the corresponding binary pixel to a reference white value.

In still another embodiment of the process 1000, the classification algorithm classifies the first pixel group in the grayscale image as a non-halftone region based at least in part on determining a sum of binary values for the plurality of pixels in the second binary block and binary values for the plurality of pixels in the second keypoint map is less than a fourth classification threshold.

In still yet another embodiment of the process 1000, the classification algorithm classifies the first pixel group in the grayscale image as a non-halftone region based at least in part on: i) a) determining a sum of quantities of keypoints in the first and second keypoint maps is less than a first classification threshold; or b) i. determining a ratio of quantities of keypoints in the first keypoint map to quantities of keypoints in the second keypoint map is less than a second classification threshold; and ii. determining the quantity of keypoints in the second keypoint map is less than a third classification threshold; and ii) determining a sum of binary values for the plurality of pixels in the second binary block and binary values for the plurality of pixels in the second keypoint map is less than a fourth classification threshold.

In another embodiment, the process 1000 also includes identifying a plurality of pixel groups in the first binary block. The plurality of pixel groups including the first pixel group. Each pixel group includes either connected pixels represented by a first binary value or connected pixels represented by a second binary value. Pixels in each pixel group that are adjacent to other pixel groups are identified as boundary pixels of the corresponding pixel group. Each of the plurality of pixel groups is processed in the same manner as the first pixel group in conjunction with segmenting the grayscale image into halftone and non-halftone regions.

In a further embodiment, the process 1000 also includes segmenting the grayscale image into halftone and non-halftone regions to form a segmented image based at least in part on the classification of the plurality of pixel groups. The segmented image is sent from the image processing device to a segment processing device via an output interface.

In yet another further embodiment, the process 1000 also includes dividing the grayscale image into a plurality of pixel blocks. The plurality of pixel blocks including the first pixel block. Each pixel block including a plurality of grayscale pixels. Each of the plurality of pixel blocks is processed in the same manner as the first pixel block in conjunction with segmenting the grayscale image into halftone and non-halftone regions. In an even further embodiment, the process 1000 also includes generating a tag plane for the grayscale image in which pixel groups classified as halftone regions are tagged as halftone regions and pixels groups classified as non-halftone regions are tagged as non-halftone regions to segment the grayscale image into halftone and non-halftone regions.

With reference to FIGS. 8-11, an exemplary embodiment of a process 1100 for segmenting an image into halftone and non-halftone regions includes the processes 800, 900, 1000 of FIGS. 8 and 9. The process 1100 continues from 1006 to 1102 where the grayscale image is segmented into halftone and non-halftone regions to form a segmented image based at least in part on the classification of the first pixel group. At 1004, The segmented image is sent from the image processing device to a segment processing device via an output interface.

Figure 12:
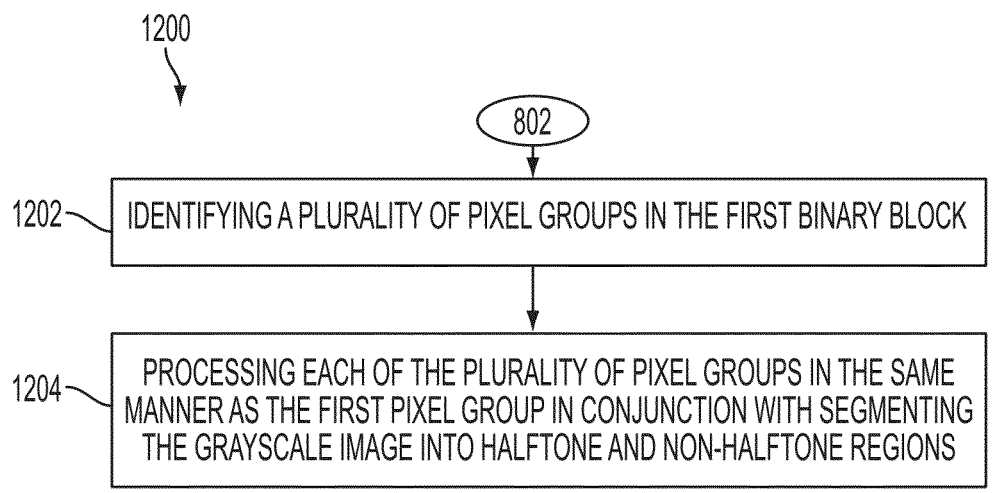
FIG. 12, in combination with FIG. 8, is a flowchart of still yet another exemplary embodiment of a process for segmenting an image into halftone and non-halftone regions.

With reference to FIGS. 8 and 12, an exemplary embodiment of a process 1200 for segmenting an image into halftone and non-halftone regions includes the process 800 of FIG. 8. The process 1200 continues from 802 to 1202 where a plurality of pixel groups are identified in the first binary block. The plurality of pixel groups including the first pixel group. Each pixel group includes either connected pixels represented by a first binary value or connected pixels represented by a second binary value. Pixels in each pixel group that are adjacent to other pixel groups are identified as boundary pixels of the corresponding pixel group. At 1204, each of the plurality of pixel groups is processed in the same manner as the first pixel group in conjunction with segmenting the grayscale image into halftone and non-halftone regions.

In another embodiment, the process 1200 also includes segmenting the grayscale image into halftone and non-halftone regions to form a segmented image based at least in part on the classification of the plurality of pixel groups. The segmented image is sent from the image processing device to a segment processing device via an output interface. In yet another further embodiment, the process 1200 also includes processing multiple pixel groups of the first binary block in parallel at the image processing device using multiple image processors.

In still another embodiment, the process 1200 also includes dividing the grayscale image into a plurality of pixel blocks. The plurality of pixel blocks including the first pixel block. Each pixel block including a plurality of grayscale pixels. Each of the plurality of pixel blocks is processed in the same manner as the first pixel block in conjunction with segmenting the grayscale image into halftone and non-halftone regions. In a further embodiment, the process 1200 also includes generating a tag plane for the grayscale image in which pixel groups classified as halftone regions are tagged as halftone regions and pixels groups classified as non-halftone regions are tagged as non-halftone regions to segment the grayscale image into halftone and non-halftone regions.

Figure 13:
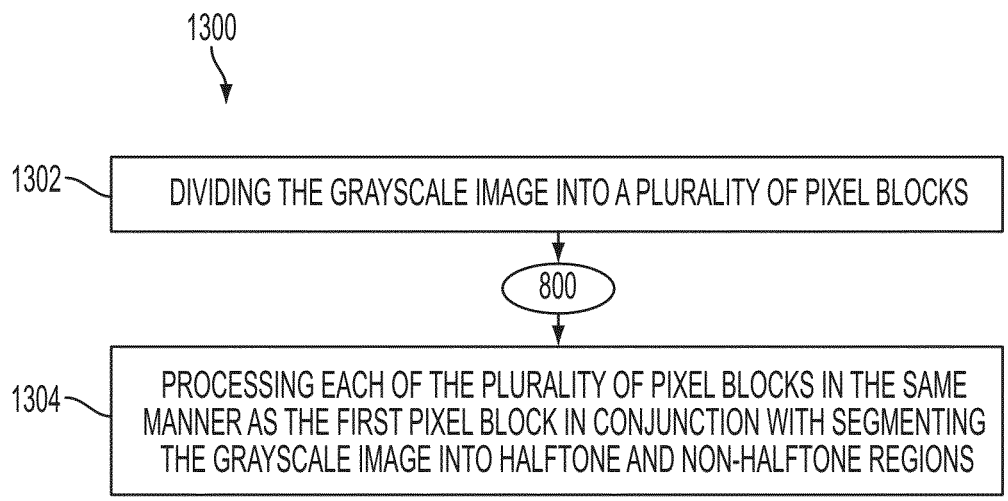
FIG. 13, in combination with FIG. 8, is a flowchart of another exemplary embodiment of a process for segmenting an image into halftone and non-halftone regions.

With reference to FIGS. 8 and 13, an exemplary embodiment of a process 1300 for segmenting an image into halftone and non-halftone regions includes the process 800 of FIG. 8. The process 1300 begins at 1302 where the grayscale image is divided into a plurality of pixel blocks. The plurality of pixel blocks including the first pixel block. Each pixel block including a plurality of grayscale pixels. Then, the process 1300 proceeds from 1302 to the process 800 of FIG. 8. At 1304, each of the plurality of pixel blocks is processed in the same manner as the first pixel block in conjunction with segmenting the grayscale image into halftone and non-halftone regions.

In another embodiment, the process 1300 also includes generating a tag plane for the grayscale image in which pixel groups classified as halftone regions are tagged as halftone regions and pixels groups classified as non-halftone regions are tagged as non-halftone regions to segment the grayscale image into halftone and non-halftone regions. In yet another embodiment, the process 1300 also includes processing multiple pixel blocks of the grayscale image in parallel at the image processing device using multiple image processors. In still another embodiment of the process 1300, each pixel block is a predetermined kernel size defined by a predetermined amount of rows and columns.

Figure 14:
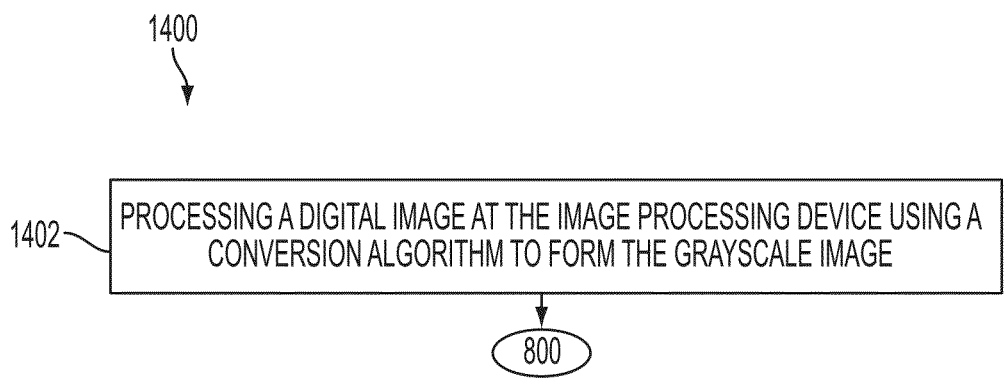
FIG. 14, in combination with FIG. 8, is a flowchart of yet another exemplary embodiment of a process for segmenting an image into halftone and non-halftone regions.

With reference to FIGS. 8 and 14, an exemplary embodiment of a process 1400 for segmenting an image into halftone and non-halftone regions includes the process 800 of FIG. 8. The process 1400 begins at 1402 where a digital image is processed at the image processing device using a conversion algorithm to form the grayscale image. The digital image including a plurality of digital pixels. The digital image was received by the image processing device from a source device via an input interface. Then, the process 1400 proceeds from 1402 to the process 800 of FIG. 8.

In another embodiment of the process 1400, the conversion algorithm adjusts a dynamic range of intensity of the digital pixels in conjunction with forming the grayscale image. In a further embodiment of the process 1400, parameters for adjusting the dynamic range of intensity of the digital pixels are obtained using a background suppression algorithm. In yet another embodiment of the process 1400, the source device includes at least one of a scanning device, a camera device, an image capturing device, and a storage device.

Figure 15:
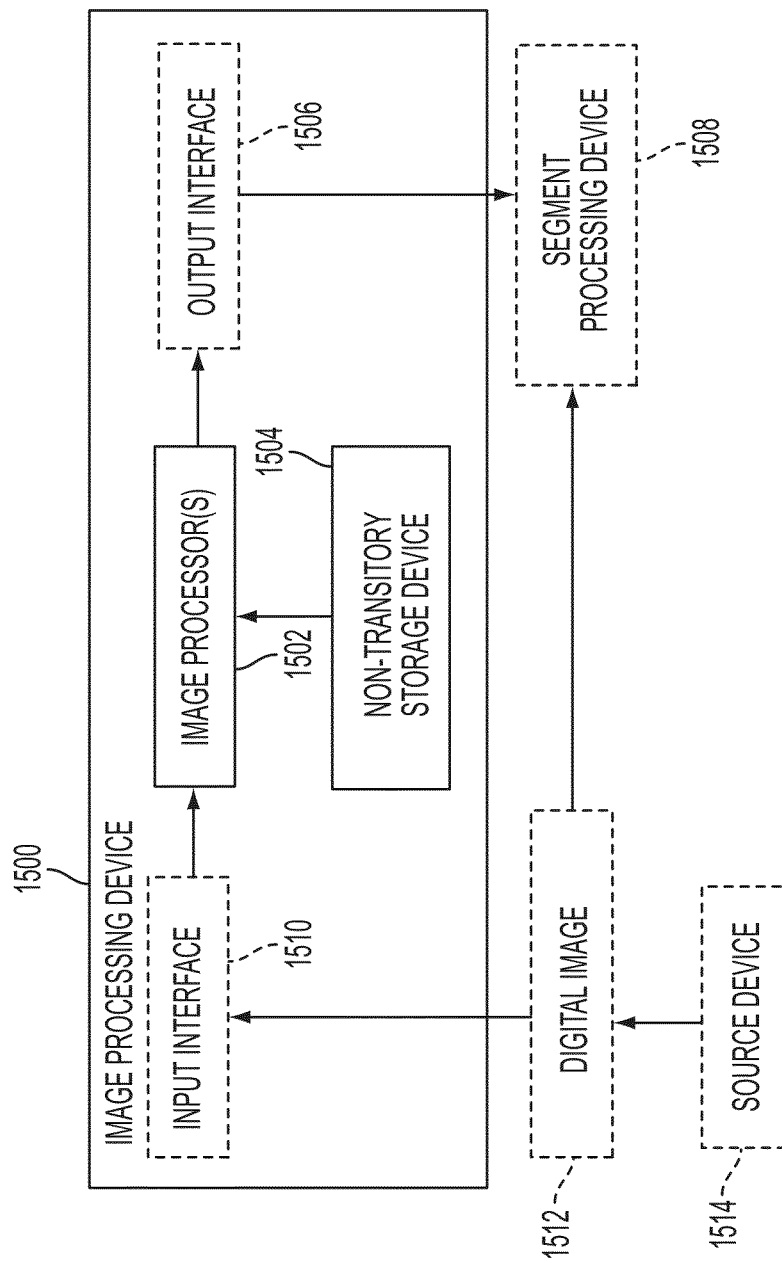
FIG. 15 is a block diagram of an exemplary embodiment of an image processing device for segmenting an image into halftone and non-halftone regions.

With reference to FIG. 15, an exemplary embodiment of an image processing device 1500 for segmenting an image into halftone and non-halftone regions includes at least one image processor 1502 and a non-transitory storage device 1504. The at least one image processor 1502 configured to execute program instructions. The non-transitory storage device 1504 configured to store program instructions that, when executed by the at least one processor 1502, cause the image processing device 1500 to perform a method of segmenting an image into halftone and non-halftone regions. As shown, the non-transitory storage device 1504 may be may be internal and local to the image processing device. Alternatively, the non-transitory storage device 1504 may be external to the image processing device 1500 or a combination of internal and external storage devices. Additionally, the non-transitory storage device 1504 may be remote to the image processing device 1500 or a combination of local and remote storage devices. In conjunction with execution of the program instructions, the at least one image processor 1502 is configured to process a first pixel block of a grayscale image using a thresholding algorithm and a first intensity threshold to form a first binary block. The first pixel block including a plurality of grayscale pixels. Each grayscale pixel having an intensity value. The first binary block including a plurality of binary pixels. Each binary pixel having a binary value. In conjunction with execution of the program instructions, the at least one image processor 1502 is configured to identify a first pixel group in the first binary block. The first pixel group includes connected pixels represented by a first binary value. Pixels in the first pixel group adjacent to pixels of the first pixel block that are represented by a second binary value are identified as boundary pixels of the first pixel group. In conjunction with execution of the program instructions, the at least one image processor 1502 is configured to process the first pixel group using a scale invariant feature transform (SIFT) algorithm to extract keypoints from the first pixel group to form a first keypoint map in conjunction with segmenting the grayscale image into halftone and non-halftone regions.

In another embodiment of the image processing device 1500, in conjunction with execution of the program instructions, the at least one image processor 1502 is configured to discard keypoints from the first keypoint map that correspond to boundary pixels of the first pixel group to form a second keypoint map for the first pixel group. In conjunction with execution of the program instructions, the at least one image processor 1502 is configured to process quantities of keypoints in the first and second keypoint maps using a classification algorithm to classify the first pixel group in the grayscale image as a halftone or non-halftone region in conjunction with segmenting the grayscale image into halftone and non-halftone regions.

In a further embodiment of the image processing device 1500, in conjunction with execution of the program instructions, the at least one image processor 1502 is configured to segment the grayscale image into halftone and non-halftone regions to form a segmented image based at least in part on the classification of the first pixel group. In this embodiment, the image processing device 1500 also includes an output interface 1506 in operative communication with a segment processing device 1508. In conjunction with execution of the program instructions, the at least one image processor 1502 is configured to send the segmented image to the segment processing device 1508 via the output interface 1506.

In another further embodiment of the image processing device 1500, in conjunction with execution of the program instructions, the at least one image processor 1502 is configured to process the first pixel block using the thresholding algorithm and a second intensity threshold to form a second binary block. The second intensity threshold representing a predetermined fixed intensity that is intended to be higher than the intensity of text objects. For example, a fixed intensity of 80 may be used for the second intensity threshold where the range of intensity is from 0 to 255. The second binary block including a plurality of binary pixels. In conjunction with execution of the program instructions, the at least one image processor 1502 is configured to identify binary pixels in the second binary block corresponding to the first pixel group. In conjunction with execution of the program instructions, the at least one image processor 1502 is configured to process binary values for pixels in the first pixel group of the second binary block and binary values for pixels in the second keypoint map using the classification algorithm to classify the first pixel group in the grayscale image as a halftone or non-halftone region in conjunction with segmenting the grayscale image into halftone and non-halftone regions.

In an even further embodiment of the image processing device 1500, in conjunction with execution of the program instructions, the at least one image processor 1502 is configured to segment the grayscale image into halftone and non-halftone regions to form a segmented image based at least in part on the classification of the first pixel group. In this embodiment, the image processing device 1500 also includes an output interface 1506 in operative communication with a segment processing device 1508. In conjunction with execution of the program instructions, the at least one image processor 1500 is configured to send the segmented image to the segment processing device 1508 via the output interface 1506.

In yet another even further embodiment of the image processing device 1500, in conjunction with execution of the program instructions, the at least one image processor 1502 is configured to identify a plurality of pixel groups in the first binary block. The plurality of pixel groups including the first pixel group. Each pixel group includes either connected pixels represented by a first binary value or connected pixels represented by a second binary value. Pixels in each pixel group that are adjacent to other pixel groups are identified as boundary pixels of the corresponding pixel group. In conjunction with execution of the program instructions, the at least one image processor 1502 is configured to process each of the plurality of pixel groups in the same manner as the first pixel group in conjunction with segmenting the grayscale image into halftone and non-halftone regions. In an even yet further embodiment of the image processing device 1500, in conjunction with execution of the program instructions, the at least one image processor 1502 is configured to segment the grayscale image into halftone and non-halftone regions to form a segmented image based at least in part on the classification of the plurality of pixel groups. In this embodiment, the image processing device 1500 includes an output interface 1506 in operative communication with a segment processing device 1508. In conjunction with execution of the program instructions, the at least one image processor 1502 is configured to send the segmented image to the segment processing device 1508 via the output interface 1506.

In another even yet further embodiment of the image processing device 1500, in conjunction with execution of the program instructions, the at least one image processor 1502 is configured to divide the grayscale image into a plurality of pixel blocks. The plurality of pixel blocks including the first pixel block. Each pixel block including a plurality of grayscale pixels. In conjunction with execution of the program instructions, the at least one image processor 1502 is configured to process each of the plurality of pixel blocks in the same manner as the first pixel block in conjunction with segmenting the grayscale image into halftone and non-halftone regions. In a still yet further embodiment of the image processing device 1500, in conjunction with execution of the program instructions, the at least one image processor 1502 is configured to generate a tag plane for the grayscale image in which pixel groups classified as halftone regions are tagged as halftone regions and pixels groups classified as non-halftone regions are tagged as non-halftone regions to segment the grayscale image into halftone and non-halftone regions.

In yet another further embodiment of the image processing device 1500, in conjunction with execution of the program instructions, the at least one image processor 1502 is configured to identify a plurality of pixel groups in the first binary block. The plurality of pixel groups including the first pixel group. Each pixel group includes either connected pixels represented by a first binary value or connected pixels represented by a second binary value. Pixels in each pixel group that are adjacent to other pixel groups are identified as boundary pixels of the corresponding pixel group. In conjunction with execution of the program instructions, the at least one image processor 1502 is configured to process each of the plurality of pixel groups in the same manner as the first pixel group in conjunction with segmenting the grayscale image into halftone and non-halftone regions.

In an even further embodiment of the image processing device 1500, in conjunction with execution of the program instructions, the at least one image processor 1502 is configured to segment the grayscale image into halftone and non-halftone regions to form a segmented image based at least in part on the classification of the plurality of pixel groups. In this embodiment, the image processing device 1500 also includes an output interface 1506 in operative communication with a segment processing device 1508. In conjunction with execution of the program instructions, the at least one image processor 1502 is configured to send the segmented image to the segment processing device 1508 via the output interface 1506.

In another even further embodiment of the image processing device 1500, in conjunction with execution of the program instructions, the at least one image processor 1502 is configured to divide the grayscale image into a plurality of pixel blocks. The plurality of pixel blocks including the first pixel block. Each pixel block including a plurality of grayscale pixels. In conjunction with execution of the program instructions, the at least one image processor 1502 is configured to process each of the plurality of pixel blocks in the same manner as the first pixel block in conjunction with segmenting the grayscale image into halftone and non-halftone regions. In an even yet further embodiment of the image processing device 1500, in conjunction with execution of the program instructions, the at least one image processor 1502 is configured to generate a tag plane for the grayscale image in which pixel groups classified as halftone regions are tagged as halftone regions and pixels groups classified as non-halftone regions are tagged as non-halftone regions to segment the grayscale image into halftone and non-halftone regions.

In yet another embodiment of the image processing device 1500, in conjunction with execution of the program instructions, the at least one image processor 1502 is configured to identify a plurality of pixel groups in the first binary block. The plurality of pixel groups including the first pixel group. Each pixel group includes either connected pixels represented by a first binary value or connected pixels represented by a second binary value. Pixels in each pixel group that are adjacent to other pixel groups are identified as boundary pixels of the corresponding pixel group. In conjunction with execution of the program instructions, the at least one image processor 1502 is configured to process each of the plurality of pixel groups in the same manner as the first pixel group in conjunction with segmenting the grayscale image into halftone and non-halftone regions.

In a further embodiment of the image processing device 1500, in conjunction with execution of the program instructions, the at least one image processor 1502 is configured to segment the grayscale image into halftone and non-halftone regions to form a segmented image based at least in part on the classification of the plurality of pixel groups. In this embodiment, the image processing device 1500 also includes an output interface 1506 in operative communication with a segment processing device 1508. In conjunction with execution of the program instructions, the at least one image processor 1502 is configured to send the segmented image to the segment processing device 1508 via the output interface 1506.

In another further embodiment of the image processing device 1500, the at least one processor 1502 includes multiple processors configured to execute the program instructions. The multiple processors are configured to process multiple pixel groups of the first binary block in parallel in conjunction with execution of the program instructions.

In yet another further embodiment of the image processing device 1500, in conjunction with execution of the program instructions, the at least one image processor 1502 is configured to divide the grayscale image into a plurality of pixel blocks. The plurality of pixel blocks including the first pixel block. Each pixel block including a plurality of grayscale pixels. In conjunction with execution of the program instructions, the at least one image processor 1502 is configured to process each of the plurality of pixel blocks in the same manner as the first pixel block in conjunction with segmenting the grayscale image into halftone and non-halftone regions. In an even further embodiment of the image processing device 1500, in conjunction with execution of the program instructions, the at least one image processor 1502 is configured to generate a tag plane for the grayscale image in which pixel groups classified as halftone regions are tagged as halftone regions and pixels groups classified as non-halftone regions are tagged as non-halftone regions to segment the grayscale image into halftone and non-halftone regions.

In still another embodiment of the image processing device 1500, in conjunction with execution of the program instructions, the at least one image processor 1502 is configured to divide the grayscale image into a plurality of pixel blocks. The plurality of pixel blocks including the first pixel block. Each pixel block including a plurality of grayscale pixels. In conjunction with execution of the program instructions, the at least one image processor 1502 is configured to process each of the plurality of pixel blocks in the same manner as the first pixel block in conjunction with segmenting the grayscale image into halftone and non-halftone regions.

In a further embodiment of the image processing device 1500, in conjunction with execution of the program instructions, the at least one image processor 1502 is configured to generate a tag plane for the grayscale image in which pixel groups classified as halftone regions are tagged as halftone regions and pixels groups classified as non-halftone regions are tagged as non-halftone regions to segment the grayscale image into halftone and non-halftone regions.

In another further embodiment of the image processing device 1500, the at least one processor 1502 includes multiple processors configured to execute the program instructions. The multiple processors are configured to process multiple pixel blocks of the grayscale image in parallel in conjunction with execution of the program instructions.

In still yet another embodiment, the image processing device 1500 also includes an input interface 1510 configured to receive a digital image 1512 from a source device 1515. In conjunction with execution of the program instructions, the at least one image processor 1502 is configured to process the digital image 1512 using a conversion algorithm to form the grayscale image. The digital image 1512 including a plurality of digital pixels. In a further embodiment of the image processing device 1500, the source device 1514 includes a scanning device, a camera device, an image capturing device, a storage device, or any suitable source device in any suitable combination.

In another embodiment of the image processing device 1500, in conjunction with execution of the program instructions, the at least one image processor 1502 is configured to calculate the first intensity threshold based at least in part on maximum and minimum intensity values for the plurality of grayscale pixels in the first pixel block and a lower range weighting factor after determining a difference between the maximum and minimum intensity values for the plurality of grayscale pixels is between an upper intensity threshold and a lower intensity threshold and, otherwise, sets the first intensity threshold based on a reference white value and a higher range weighting factor, the higher range weighting factor being greater than the lower range weighting factor.

With reference to FIGS. 8-15, various exemplary embodiments of non-transitory computer-readable medium storing program instructions that, when executed by at least one processor (1502), cause a corresponding image processing device (1500) to perform a method of segmenting an image into halftone and non-halftone regions. For example, various embodiments of the image processing device 1500 are described above with reference to FIG. 15. Various embodiments of the method of segmenting an image into halftone and non-halftone regions 800, 900, 1000, 1100, 1200, 1300, 1400, for example, are described above with reference to FIGS. 8-14.

In addition to the disclosure above, various exemplary embodiments of non-transitory computer-readable medium are disclosed herein. The various embodiments of non-transitory computer-readable medium store program instructions that, when executed by at least one processor (1502), may cause a corresponding image processing device 1500 to perform various combinations of functions associated with the various embodiments of the processes 800, 900, 1000, 1100, 1200, 1300, 1400 for segmenting an image into halftone and non-halftone regions described above with reference to FIGS. 8-14. For example, the various embodiments of the image processing device 1500 described above with reference to FIG. 15 may include the at least one processor 1502 and may perform the various combination of functions associated with segmenting an image into halftone and non-halftone regions based on the program instructions stored on corresponding embodiments of the non-transitory computer readable medium.

In other words, the program instructions of the various exemplary embodiments of non-transitory computer-readable medium are defined by any suitable combination of the processes 800, 900, 1000, 1100, 1200, 1300, 1400 described above with reference to FIGS. 8-14. Similarly, the at least one processor 1502 and the image processing device 1500 associated with the various exemplary embodiments of non-transitory computer-readable medium are defined by any suitable combination of the image processing device 1500 described above with reference to FIG. 15.

It will be appreciated that variants of the above-disclosed and other features and functions, or alternatives thereof, may be combined into many other different computer platforms, computer applications, or combinations thereof. Various presently unforeseen or unanticipated alternatives, modifications, variations, or improvements therein may be subsequently made by those skilled in the art which are also intended to be encompassed by the following claims.

What is claimed is:

1. A method of segmenting an image into halftone and non-halftone regions, comprising:
   processing a first pixel block of a grayscale image at an image processing device using a thresholding algorithm and a first intensity threshold to form a first binary block, the first pixel block including a plurality of grayscale pixels, each grayscale pixel having an intensity value, the first binary block including a plurality of binary pixels, each binary pixel having a binary value;
   identifying a first pixel group in the first binary block, wherein the first pixel group includes connected pixels represented by a first binary value, wherein pixels in the first pixel group adjacent to pixels of the first pixel block that are represented by a second binary value are identified as boundary pixels of the first pixel group; and
   processing the first pixel group at the image processing device using a scale invariant feature transform (SIFT) algorithm to extract keypoints from the first pixel group to form a first keypoint map in conjunction with segmenting the grayscale image into halftone and non-halftone regions.

2. The method of claim 1, further comprising:
   discarding keypoints from the first keypoint map that correspond to boundary pixels of the first pixel group to form a second keypoint map for the first pixel group; and
   processing quantities of keypoints in the first and second keypoint maps at the image processing device using a classification algorithm to classify the first pixel group in the grayscale image as a halftone or non-halftone region in conjunction with segmenting the grayscale image into halftone and non-halftone regions.

3. The method of claim 2, further comprising:
   segmenting the grayscale image into halftone and non-halftone regions to form a segmented image based at least in part on the classification of the first pixel group; and
   sending the segmented image from the image processing device to a segment processing device via an output interface.

4. The method of claim 2 wherein the classification algorithm classifies the first pixel group in the grayscale image as a non-halftone region based at least in part on determining a sum of quantities of keypoints in the first and second keypoint maps is less than a first classification threshold.

5. The method of claim 2 wherein the classification algorithm classifies the first pixel group in the grayscale image as a non-halftone region based at least in part on determining a ratio of quantities of keypoints in the first keypoint map to quantities of keypoints in the second keypoint map is less than a second classification threshold.

6. The method of claim 2 wherein the classification algorithm classifies the first pixel group in the grayscale image as a non-halftone region based at least in part on determining the quantity of keypoints in the second keypoint map is less than a third classification threshold.

7. The method of claim 2, further comprising:
   processing the first pixel block at the image processing device using the thresholding algorithm and a second intensity threshold to form a second binary block, the second intensity threshold representing a predetermined fixed intensity that is intended to be higher than the intensity of text objects, the second binary block including a plurality of binary pixels;
   identifying binary pixels in the second binary block corresponding to the first pixel group; and
   processing binary values for pixels in the first pixel group of the second binary block and binary values for pixels in the second keypoint map at the image processing device using the classification algorithm to classify the first pixel group in the grayscale image as a halftone or non-halftone region in conjunction with segmenting the grayscale image into halftone and non-halftone regions.

8. The method of claim 7 wherein the classification algorithm classifies the first pixel group in the grayscale image as a non-halftone region based at least in part on determining a sum of binary values for the plurality of pixels in the second binary block and binary values for the plurality of pixels in the second keypoint map is less than a fourth classification threshold.

9. The method of claim 1, further comprising:
   identifying a plurality of pixel groups in the first binary block, the plurality of pixel groups including the first pixel group, wherein each pixel group includes either connected pixels represented by a first binary value or connected pixels represented by a second binary value, wherein pixels in each pixel group that are adjacent to other pixel groups are identified as boundary pixels of the corresponding pixel group; and
   processing each of the plurality of pixel groups in the same manner as the first pixel group in conjunction with segmenting the grayscale image into halftone and non-halftone regions.

10. The method of claim 9, further comprising:
processing multiple pixel groups of the first binary block in parallel at the image processing device using multiple image processors.

11. The method of claim 1, further comprising:
dividing the grayscale image into a plurality of pixel blocks, the plurality of pixel blocks including the first pixel block, each pixel block including a plurality of grayscale pixels; and
processing each of the plurality of pixel blocks in the same manner as the first pixel block in conjunction with segmenting the grayscale image into halftone and non-halftone regions.

12. The method of claim 11, further comprising:
generating a tag plane for the grayscale image in which pixel groups classified as halftone regions are tagged as halftone regions and pixels groups classified as non-halftone regions are tagged as non-halftone regions to segment the grayscale image into halftone and non-halftone regions.

13. The method of claim 11, further comprising:
processing multiple pixel blocks of the grayscale image in parallel at the image processing device using multiple image processors.

14. The method of claim 1, further comprising:
processing a digital image at the image processing device using a conversion algorithm to form the grayscale image, the digital image including a plurality of digital pixels, wherein the digital image was received by the image processing device from a source device via an input interface.

15. The method of claim 1 wherein, for each grayscale pixel in the first pixel block, the thresholding algorithm sets the corresponding binary pixel in the first binary block to a reference black value after determining the corresponding grayscale pixel is lower in intensity than the first intensity threshold and, otherwise, sets the corresponding binary pixel to a reference white value.

16. The method of claim 1, further comprising:
calculating the first intensity threshold at the image processing device based at least in part on maximum and minimum intensity values for the plurality of grayscale pixels in the first pixel block and a lower range weighting factor after determining a difference between the maximum and minimum intensity values for the plurality of grayscale pixels is between an upper intensity threshold and a lower intensity threshold and, otherwise, sets the first intensity threshold based on a reference white value and a higher range weighting factor, the higher range weighting factor being greater than the lower range weighting factor.

17. An image processing device for segmenting an image into halftone and non-halftone regions, comprising:
at least one image processor configured to execute program instructions; and
a non-transitory storage device configured to store program instructions that, when executed by the at least one processor, cause the image processing device to perform a method of segmenting an image into halftone and non-halftone regions;
wherein, in conjunction with execution of the program instructions, the at least one image processor is configured to process a first pixel block of a grayscale image using a thresholding algorithm and a first intensity threshold to form a first binary block, the first pixel block including a plurality of grayscale pixels, each grayscale pixel having an intensity value, the first binary block including a plurality of binary pixels, each binary pixel having a binary value;
wherein, in conjunction with execution of the program instructions, the at least one image processor is configured to identify a first pixel group in the first binary block, wherein the first pixel group includes connected pixels represented by a first binary value, wherein pixels in the first pixel group adjacent to pixels of the first pixel block that are represented by a second binary value are identified as boundary pixels of the first pixel group;
wherein, in conjunction with execution of the program instructions, the at least one image processor is configured to process the first pixel group using a scale invariant feature transform (SIFT) algorithm to extract keypoints from the first pixel group to form a first keypoint map in conjunction with segmenting the grayscale image into halftone and non-halftone regions.

18. The image processing device of claim 17 wherein, in conjunction with execution of the program instructions, the at least one image processor is configured to discard keypoints from the first keypoint map that correspond to boundary pixels of the first pixel group to form a second keypoint map for the first pixel group;
wherein, in conjunction with execution of the program instructions, the at least one image processor is configured to process quantities of keypoints in the first and second keypoint maps using a classification algorithm to classify the first pixel group in the grayscale image as a halftone or non-halftone region in conjunction with segmenting the grayscale image into halftone and non-halftone regions.

19. The image processing device of claim 18 wherein, in conjunction with execution of the program instructions, the at least one image processor is configured to segment the grayscale image into halftone and non-halftone regions to form a segmented image based at least in part on the classification of the first pixel group, the image processing device further comprising:
an output interface in operative communication with a segment processing device;
wherein, in conjunction with execution of the program instructions, the at least one image processor is configured to send the segmented image to the segment processing device via the output interface.

20. The image processing device of claim 17 wherein, in conjunction with execution of the program instructions, the at least one image processor is configured to identify a plurality of pixel groups in the first binary block, the plurality of pixel groups including the first pixel group, wherein each pixel group includes either connected pixels represented by a first binary value or connected pixels represented by a second binary value, wherein pixels in each pixel group that are adjacent to other pixel groups are identified as boundary pixels of the corresponding pixel group;
wherein, in conjunction with execution of the program instructions, the at least one image processor is configured to process each of the plurality of pixel groups in the same manner as the first pixel group in conjunction with segmenting the grayscale image into halftone and non-halftone regions.

21. The image processing device of claim 20, the at least one processor comprising:
multiple processors configured to execute the program instructions, wherein the multiple processors are configured to process multiple pixel groups of the first binary block in parallel in conjunction with execution of the program instructions.

22. The image processing device of claim 17 wherein, in conjunction with execution of the program instructions, the at least one image processor is configured to divide the grayscale image into a plurality of pixel blocks, the plurality of pixel blocks including the first pixel block, each pixel block including a plurality of grayscale pixels;
   wherein, in conjunction with execution of the program instructions, the at least one image processor is configured to process each of the plurality of pixel blocks in the same manner as the first pixel block in conjunction with segmenting the grayscale image into halftone and non-halftone regions.

23. The image processing device of claim 22, the at least one processor comprising:
   multiple processors configured to execute the program instructions, wherein the multiple processors are configured to process multiple pixel blocks of the grayscale image in parallel in conjunction with execution of the program instructions.

24. The image processing device of claim 17, further comprising:
   an input interface configured to receive a digital image from a source device;
   wherein, in conjunction with execution of the program instructions, the at least one image processor is configured to process the digital image using a conversion algorithm to form the grayscale image, the digital image including a plurality of digital pixels.

25. The image processing device of claim 24 wherein the source device includes at least one of a scanning device, a camera device, an image capturing device, and a storage device.

26. A non-transitory computer-readable medium storing program instructions that, when executed by at least one processor, cause a corresponding image processing device to perform a method of segmenting an image into halftone and non-halftone regions, the method comprising:
   processing a first pixel block of a grayscale image at an image processing device using a thresholding algorithm and a first intensity threshold to form a first binary block, the first pixel block including a plurality of grayscale pixels, each grayscale pixel having an intensity value, the first binary block including a plurality of binary pixels, each binary pixel having a binary value;
   identifying a first pixel group in the first binary block, wherein the first pixel group includes connected pixels represented by a first binary value, wherein pixels in the first pixel group adjacent to pixels of the first pixel block that are represented by a second binary value are identified as boundary pixels of the first pixel group;
   processing the first pixel group at the image processing device using a scale invariant feature transform (SIFT) algorithm to extract keypoints from the first pixel group to form a first keypoint map in conjunction with segmenting the grayscale image into halftone and non-halftone regions;
   discarding keypoints from the first keypoint map that correspond to boundary pixels of the first pixel group to form a second keypoint map for the first pixel group;
   processing quantities of keypoints in the first and second keypoint maps at the image processing device using a classification algorithm to classify the first pixel group in the grayscale image as a halftone or non-halftone region in conjunction with segmenting the grayscale image into halftone and non-halftone regions;
   processing the first pixel block at the image processing device using the thresholding algorithm and a second intensity threshold to form a second binary block, the second intensity threshold representing a predetermined fixed intensity that is intended to be higher than the intensity of text objects, the second binary block including a plurality of binary pixels;
   identifying binary pixels in the second binary block corresponding to the first pixel group;
   processing binary values for pixels in the first pixel group of the second binary block and binary values for pixels in the second keypoint map at the image processing device using the classification algorithm to classify the first pixel group in the grayscale image as a halftone or non-halftone region in conjunction with segmenting the grayscale image into halftone and non-halftone regions;
   segmenting the grayscale image into halftone and non-halftone regions to form a segmented image based at least in part on the classification of the first pixel group; and
   sending the segmented image from the image processing device to a segment processing device via an output interface.

* * * * *